United States Patent
Vishakhadatta (10) Patent No.: US 7,805,170 B2
(45) Date of Patent: Sep. 28, 2010

(54) SYSTEM AND METHOD FOR EFFICIENT POWER SUPPLY REGULATION COMPATIBLE WITH RADIO FREQUENCY OPERATION

(75) Inventor: G. Diwakar Vishakhadatta, Austin, TX (US)

(73) Assignee: ST-Ericsson SA, Geneva (CH)

( * ) Notice: Subject to any disclaimer, the term of this patent is extended or adjusted under 35 U.S.C. 154(b) by 1151 days.

(21) Appl. No.: 11/094,583

(22) Filed: Mar. 30, 2005

(65) Prior Publication Data

US 2006/0229024 A1 Oct. 12, 2006

(51) Int. Cl.
*H04B 1/00* (2006.01)
(52) U.S. Cl. .................... 455/574; 455/343.1
(58) Field of Classification Search ............ 455/550.1, 455/574, 343.1, 343.2, 343.3, 343.4, 343.5; 323/273, 280

See application file for complete search history.

(56) References Cited

U.S. PATENT DOCUMENTS

| | | | |
|---|---|---|---|
| 4,384,361 A | 5/1983 | Masaki |
| 4,805,165 A | 2/1989 | Kawamura et al. |
| 4,870,699 A | 9/1989 | Garner et al. |
| 4,879,758 A | 11/1989 | DeLuca et al. |
| 4,930,126 A | 5/1990 | Kazecki et al. |
| 4,996,639 A | 2/1991 | Ishimoto et al. |
| 5,031,233 A | 7/1991 | Ragan |
| 5,058,203 A | 10/1991 | Inagami |
| 5,142,699 A | 8/1992 | Sato et al. |
| 5,150,361 A | 9/1992 | Wieczorek et al. |
| 5,151,769 A | 9/1992 | Immorlica, Jr. et al. |
| 5,241,541 A | 8/1993 | Farrell et al. |
| 5,280,644 A | 1/1994 | Vannatta et al. |
| 5,307,066 A | 4/1994 | Kobayashi et al. |
| 5,355,524 A | 10/1994 | Higgins, Jr. |
| 5,448,755 A | 9/1995 | Tanaka |

(Continued)

FOREIGN PATENT DOCUMENTS

EP 0447302 A1 9/1991

(Continued)

OTHER PUBLICATIONS

Office Action in EPO application No. 06734840.9, mailed Aug. 12, 2008.

(Continued)

*Primary Examiner*—Thanh C Le
(74) *Attorney, Agent, or Firm*—William J. Kubida; Scott J. Hawranek; Hogan Lovells US LLP (57) ABSTRACT

One aspect of the invention is directed towards a switching power regulator and a non-switching power regulator in conjunction to provide regulated power to the digital logic. The digital logic and switching regulator may be deactivated during RF activity so that interference from both the digital circuitry and the switching regulator is significantly reduced. Also, the state of the digital circuitry may be maintained during this standby period by using the non-switching power regulator to provide an as-required leakage current to the digital circuitry in order to maintain state. After the RF event (e.g. sending or receiving data) has concluded, the switching regulator may be activated and digital processing continued using the digital logic with no loss of continuity.

29 Claims, 7 Drawing Sheets

U.S. PATENT DOCUMENTS

| | | | |
|---|---|---|---|
| 5,471,471 A | 11/1995 | Freeburg et al. | |
| 5,471,663 A | 11/1995 | Davis | |
| 5,475,684 A | 12/1995 | Shimizu | |
| 5,502,369 A | 3/1996 | Niwayama | |
| 5,519,711 A | 5/1996 | Sointula | |
| 5,604,928 A | 2/1997 | Hamano et al. | |
| 5,606,739 A * | 2/1997 | Goto | 455/343.3 |
| 5,630,224 A | 5/1997 | Swail | |
| 5,649,160 A | 7/1997 | Corry et al. | |
| 5,758,278 A | 5/1998 | Lansdowne | |
| 5,764,693 A | 6/1998 | Taylor et al. | |
| 5,773,966 A | 6/1998 | Steigerwald | |
| 5,812,936 A | 9/1998 | DeMont | |
| 5,838,741 A | 11/1998 | Callaway, Jr. et al. | |
| 5,842,037 A | 11/1998 | Haartsen | |
| 5,872,540 A | 2/1999 | Casabona et al. | |
| 5,875,449 A | 2/1999 | Ono | |
| 5,917,854 A | 6/1999 | Taylor et al. | |
| 5,920,592 A | 7/1999 | Tanaka et al. | |
| 5,923,761 A | 7/1999 | Lodenius | |
| 5,953,640 A | 9/1999 | Meador et al. | |
| 6,020,614 A | 2/2000 | Worley | |
| 6,150,798 A | 11/2000 | Ferry et al. | |
| 6,229,289 B1 | 5/2001 | Piovaccari | |
| 6,243,597 B1 | 6/2001 | Daanen | |
| 6,246,335 B1 | 6/2001 | Tsunoda | |
| 6,366,622 B1 | 4/2002 | Brown et al. | |
| 6,452,368 B1 | 9/2002 | Basso et al. | |
| 6,480,553 B1 | 11/2002 | Ho et al. | |
| 6,484,041 B1 * | 11/2002 | Aho et al. | 455/574 |
| 6,498,819 B1 | 12/2002 | Martin | |
| 6,510,185 B2 | 1/2003 | Lee et al. | |
| 2002/0080728 A1 | 6/2002 | Sugar et al. | |
| 2003/0020521 A1 | 1/2003 | Lee et al. | |
| 2007/0087722 A1* | 4/2007 | Ichihara | 455/343.1 |

FOREIGN PATENT DOCUMENTS

| | | |
|---|---|---|
| EP | 0447302 B1 | 9/1991 |
| EP | 0511511 A2 | 11/1992 |
| EP | 0511511 A3 | 11/1992 |
| EP | 0511511 B1 | 11/1992 |
| GB | 0463621 | 1/2000 |

OTHER PUBLICATIONS

Communication pursuant to Article 94(3) EPC, App. No. 06 734 840.9-1233, mailing date Apr. 17, 2009, pp. 4.

International Search report for PCT/US2006/004885, dated Sep. 11, 2007, pp. 1-4.

IPRP for PCT/US2006/004885, dated Oct. 6, 2007, pp. 6.

Sooch and Tuttle, Patent Application for "Highly Integrated Radio-Frequency Apparatus and Associated Methods," Apr. 29, 2003.

* cited by examiner

FIGURE 6

SYSTEM AND METHOD FOR EFFICIENT POWER SUPPLY REGULATION COMPATIBLE WITH RADIO FREQUENCY OPERATION

RELATED APPLICATIONS

This application is related to U.S. patent application Ser. No. 10/426,042 by inventors Navdeep S. Sooch and G. Tyson Tuttle, entitled "Highly Integrated Radio-Frequency Apparatus and Associated Methods" filed on Apr. 29, 2003, the entire contents of which are hereby expressly incorporated by reference for all purposes.

TECHNICAL FIELD OF THE INVENTION

The invention relates in general to methods and systems for the regulation of power supplies, and more particularly, to methods and systems for the efficient regulation of power supplies in a radio frequency environment.

BACKGROUND OF THE INVENTION

Increasingly in the world of mobile devices two trends have manifested themselves: a desire for increasingly miniaturized devices and a desire for greater and broader degrees of functionality. Unfortunately, these desires are often antithetical to one another, and create a number of tensions in the design and implementation of these mobile devices. One of these tensions is the balance that must be achieved between the power supplies utilized by these mobile devices, and the functionality of the radio frequency (RF) transceivers which frequently provide communication capabilities for the mobile devices.

As a switching regulator typically draws less power than a linear regulator, switching regulators are generally the preferred solution for power conscious applications. Typically, a switching regulator is used to regulate power to the digital logic of a mobile device, while a linear power supply is used to regulate power to the RF circuitry of the mobile device.

However, the switching activity of these switching regulators creates RF radiation which can interfere with the RF circuitry of these mobile devices by creating RF noise that impacts the RF signals received and transmitted by the device.

Thus, a need exists for methods and systems in which efficient power regulators can be used in conjunction with mobile devices where the power regulation will not interfere with the RF functionality of the mobile devices.

SUMMARY OF THE INVENTION

The invention includes the ability to regulate the power supplied to a mobile device in order to reduce radio frequency (RF) interference in a system that incorporates both RF and digital functionality are disclosed. The invention can utilize a switching power regulator and a non-switching power regulator in conjunction to provide regulated power to the digital logic. The digital logic and switching regulator may be deactivated during RF activity so that interference from both the digital circuitry and the switching regulator is significantly reduced. The state of the digital circuitry may be maintained during this standby period by using the non-switching power regulator to provide an as-required leakage current to the digital circuitry in order to maintain state. After the RF event (e.g. sending or receiving data) has concluded, the switching regulator may be activated and digital processing continued using the digital logic with no loss of continuity.

In one embodiment, the digital logic can be operated and receive power from a switching power regulator. When the RF circuitry is operated the digital logic and the switching power regulator are inactive. When the digital logic is inactive it receives power from a second power regulator.

In yet another embodiment, the period in which the digital logic is active coincides with a signal-processing time-slot and the period when the RF circuitry is active coincides with a RF time-slot.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

DESCRIPTION OF PREFERRED EMBODIMENTS

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. After reading the specification, various substitutions, modifications, additions and rearrangements will become apparent to those skilled in the art from this disclosure which do not depart from the scope of the appended claims.

Attention is now directed to highly efficient systems and methods for providing power supply regulation in a device (e.g. a mobile device such as a cellular telephone) that incorporates both radio frequency (RF) and digital circuitry that will minimize interference with the RF portion of these systems. These systems and methods may utilize a switching power regulator and a linear power regulator in conjunction to supply regulated power to these RF and digital sections. The digital logic and switching regulator may be deactivated during RF activity so that interference from both the digital circuitry and the switching regulator is significantly reduced. The state of the digital circuitry may be maintained during this standby period through the use of the linear supply, which may supply the leakage current to the digital circuitry to maintain state. In one embodiment, after the RF event has concluded (or with some overlap), the switching regulator may be activated and digital processing continued using the digital circuitry without loss of continuity.

In order to be able to properly provide power to the digital circuits of a mobile device, in most cases the operational supply voltages provided from the batteries of the mobile device must be regulated down to conform to the operational supply voltages required by the digital process lines of the device. For example, a battery may nominally vary from 5v in full charge state to 3v in full-discharge, while in a digital process line width of 0.18μ the maximum supply voltage is 1.8v+10%. This power supply voltage regulation is usually done either by a linear regulator or a switching regulator.

Linear regulators operate by applying the difference in voltage between the battery and the core voltage on a pass-transistor device. The current from the battery is the same as the current consumed by the digital core, resulting in a power dissipation from the battery that is Vbat*Iload.

Switching regulators may operate by switching an inductor between $V_{bat}$ and ground (GND). Due to the property of the inductor, some of the supply current is supplied from GND. The average power dissipated from $V_{bat}$ is ideally equal to the power dissipated in the load circuit, i.e., $V_{load}*I_{load}$. In practice, switching regulators are not perfect, so their efficiency, η, results in the power dissipated from the battery being equal to $(V_{load}*I_{load})/\eta$. For typical implementations, η can vary from 0.85 to 0.9. As a consequence, the average current drawn from the battery is $(V_{load}*I_{load})/(Vbat*\eta)$. Thus, for a typical application where $V_{load}$ is 1.8v, and Vbat ranges from 3 to 5v, it can be seen that the power drawn from the battery is significantly less than $I_{load}$, thus providing a maximization of battery life. As can be imagined, these switching regulators are generally the preferred solution for power conscious applications.

However, the switching activity of these switching regulators creates RF radiation which can interfere with the RF circuitry of these mobile devices by creating RF noise that impacts the RF signals received and transmitted by the device.

In current mobile device applications a multiple-cavity design is used to provide isolation between the digital logic and the RF circuitry. In mobile devices today the digital core responsible for the digital processing of the device is located on a baseband integrated circuit which resides in a cavity separate from the RF circuitry. The switching regulator may be located in the same cavity as the baseband integrated circuit, or in yet another cavity which is separate from the RF circuitry. This multiple-cavity system works to shield the sensitive RF circuitry from the noise of the switching regulator as well as the noise of the digital baseband circuit.

This multiple-cavity solution to noise issues is, however, incompatible with the desire to reduce the size and cost of mobile devices by, for example, integrating the digital baseband functionality, analog functionality and RF transceiver on the same monolithic integrated circuit. Thus, a need exists for methods and systems in which efficient power regulators can be used in conjunction with single-chip mobile devices where the power regulation will not interfere with the RF functionality of the mobile devices.

Figure 1:
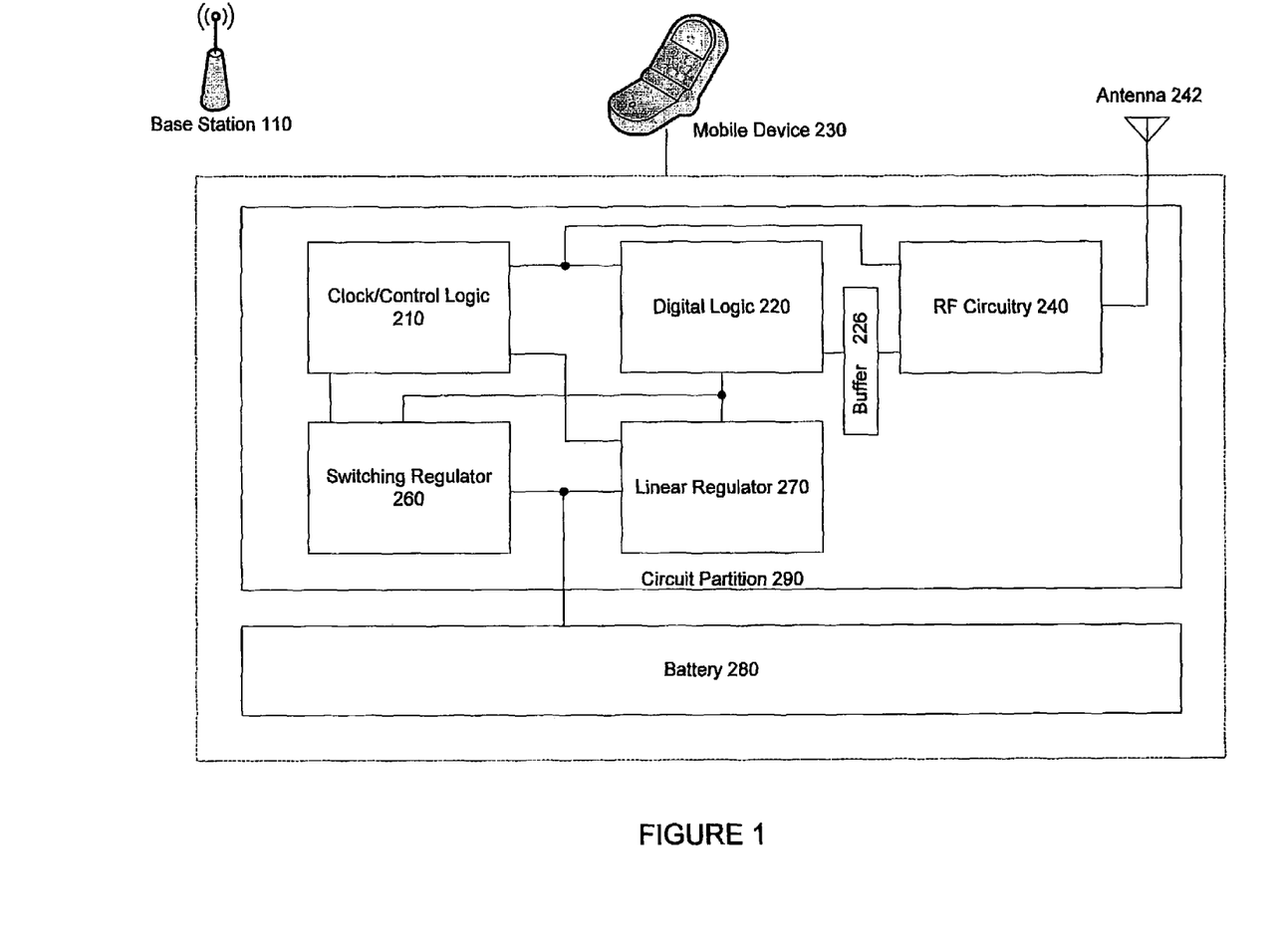
FIG. 1 includes a block diagram of one embodiment of a mobile device.

Turning now to FIG. 1, one embodiment of a system for providing power supply regulation that reduces interference with the RF portion of a mobile device is depicted. Mobile device 230 may be any mobile device that receives or transmits RF communications and includes any digital processing capabilities. For purposes of this example, mobile device 230 is a cellular telephone. To implement this functionality, mobile device 230 contains digital logic or circuitry 220, RF circuitry 240, antenna 242, clock/control logic 210, switching regulator 260, and non-switching (e.g. linear) regulator 270 on circuit partition 290. Switching regulator 260 and linear regulator 270 are coupled in parallel to battery 280 and both are operable to supply current to digital logic 220. Switching regulator 260 may be an inductive or capacitive DC-DC switching regulator, or any other type of switching regulator as is known in the art to be useful in mobile device applications. Non-switching regulator 270 may be a linear regulator, or any other type of non-switching regulator as is known in the art to be useful in mobile device applications (note that while switching regulator 260 and linear regulator 270 are located on circuit partition 290 in the depicted embodiment, in other embodiments they may not be located on circuit partition 290). In some cases, linear regulator 270 will also supply current to RF circuitry 240, though other arrangements will be possible. For example, RF circuitry 240 may be supplied current by another linear regulator (not shown), as RF circuitry 240 may have a different current requirement than that of the current output by linear regulator 270.

Circuit partition 290 may constitute a variety of substrates, carriers, or packaging arrangements, as known to persons of ordinary skill in the art. By way of illustration, circuit partition 290 may be a circuit partition and comprise an integrated circuit (IC), a semiconductor die, thin-film substrate, thick-film substrate, an isolated partition on a single substrate, a circuit-board partition, a module, a multi-chip module (MCM), and the like, as desired. In one particular embodiment, digital logic 220 and RF circuitry 240 may be placed on a single circuit partition 290, including an integrated circuit.

During operation of mobile device 230, data may be received from digital logic 220 and transmitted through antenna 242 by RF circuitry 240, as is known in the art. By the same token, data may be received at antenna 242 by RF circuitry 240 and communicated to digital logic 220 for processing. Additionally, digital logic 220 may perform processing tasks unrelated to messages received or transmitted by RF circuitry 240. Clock/control logic 210 may control operations of the components of circuit partition 290 and provide clock signals to components of circuit partition 290 which use a clock, such as digital logic 220.

As elaborated on above, because both digital logic 220 and RF circuitry 240 are located in close proximity to one another, it is desirable that digital logic 220 and RF circuitry 240 are not active simultaneously, as digital logic 220 can generate interference deleterious to the performance of RF circuitry 240. Thus, when RF circuitry 240 is active, digital logic 220 may be inactive, while the opposite scenario may be true as well. Inactivity may consist of partially powering down (e.g. turning off), disabling or inhibiting circuitry associated with digital logic 220 during operation of RF circuitry 240. Some circuitry within digital logic section 220 may still be active, however. One may deactivate, turn off, disable, or inhibit as much of digital logic 220 as is practical or desired to reduce interference to an acceptable level.

For the same reasons, it is desirable that switching regulator 260 be inactive when RF circuitry 240 is active, as the switching activity of switching regulator 260 also creates RF radiation which can interfere with the operation of RF circuitry 240. On the other hand, it is advantageous to use switching regulator 260 to supply current to digital logic 220 as much as possible to prolong the life of battery 280, as a switching regulator 260 is far more efficient than a linear regulator 270. Consequently, in one embodiment, when digital logic 220 is active, it is supplied current by switching regulator 260.

To maintain continuity in the processing of data by digital logic 220, however, the state of digital logic should be maintained while digital logic 220 is inactive during activity of RF circuitry 240. During these periods when digital logic 220 is inactive, current may be supplied to digital logic 220 by linear regulator 270 to preserve the state of digital logic 220. In one embodiment, when digital logic 220 is inactive, digital logic 220 may only use the leakage current of the various gates comprising digital logic 220 to maintain state. This current requirement is relatively small as compared to the current consumption of digital logic 220 when active, thus the power dissipated during periods of inactivity of digital logic 220 is relatively small.

By alternately supplying current to digital logic 220 with switching regulator 260 when digital logic 220 is active, and with linear regulator 270 when digital logic 220 is inactive, the benefit of efficient supply regulation may be achieved commensurately with the benefits of low RF interference from linear regulator 270. For example, if digital logic 220 consumes 200 mA when active, and 1 mA in leakage when inactive, and if it is assumed that digital logic 220 is active for 25% of the time, that battery 280 voltage is 5.5v, switching regulator 260 is 85% efficient and that the core voltage is 1.2v; from switching regulator 260 the average current consumption would be 0.75*1 mA+0.25*(1.2*200 mA/5.5)/0.85=13.58 mA from battery 280. From linear regulator, the average current consumption for the same situation would be 0.75*1 mA+0.25*200 mA=50.75 mA from battery 280.

As can be seen, using the embodiment described above with respect to this example, current drawn from battery 280 is lower by 73% in comparison to the case where both digital logic 220 and RF circuitry 240 are supplied current solely by linear regulator 270. Even in the case where battery voltage drops to 3v, the average current drawn from battery 280 by switching regulator 260 is 24.28 ma, 52.16% less current than the comparable case using linear regulator 270. This reduced power drain translates directly into increased battery life for the embodiment of the system described as compared to using linear regulator 270 alone to supply current to the system.

Returning to FIG. 1, the transition between the current sources for digital logic 220 may be accomplished in a variety of ways. In one embodiment, linear regulator 270 and switching regulator 260 can be activated and deactivated by clock/control logic 210, which regulates the activity of RF circuitry 240 and digital logic 220. Thus, when a window of RF activity is started by clock/control logic 210, the clock to digital logic 220 is discontinued, switching regulator 260 is deactivated and simultaneously linear regulator 270 is activated. Conversely, when a window of RF activity is closed, switching regulator 260 is activated, linear regulator 270 deactivated, the clock to digital logic 220 is restored and a window of digital processing using digital logic 220 is commenced by clock/control logic 210.

In another embodiment, switching regulator 260 is set to regulate the load voltage to a slightly higher value than may be provided by linear regulator 270. As a result, only linear regulator 270 need be activated or deactivated by clock/control logic 210. When a window of digital activity is initiated, switching regulator 260 is activated and the regulated voltage to digital logic 220 is pulled to a higher value than is maintained by linear regulator 270 alone, deactivating linear regulator 270. The clock to digital logic 220 is then started. Similarly, when a window of RF activity is initiated by clock/control logic 210, switching regulator 260 is deactivated by clock/control logic 210 and the clock to digital logic 220 is stopped. The leakage current of digital logic 220 will then gradually dissipate voltage until linear regulator 270 can take over.

The methods and systems according to the invention may be applied in a variety of flexible ways and in a multitude of communication systems, as persons of ordinary skill in the art who have the benefit of the description of the invention understand. Generally, one may employ the novel concepts according to the present invention in time-division-multiplexed (TDM) communication systems. Time-division multiple access (TDMA) systems are an example of TDM communication systems. (The GSM and GPRS systems, TDMA systems, constitute other TDM communication system.) Furthermore, one may readily configure communication apparatuses according to the invention to operate according to a variety of communication protocols, channels, and frequency bands (e.g., GSM, PCS, and DCS), as desired.

In particular, the systems and methods of the present invention may be implemented in conjunction with a time-domain isolation nature of the system or apparatus where the RF circuitry operates when the digital circuitry is inactive, and vice-versa as depicted in U.S. patent application Ser. No. 10/426,042, entitled "Highly Integrated Radio-Frequency Apparatus and Associated Methods" by Navdeep S. Sooch and G. Tyson Tuttle, filed on Apr. 29, 2003, which is hereby incorporated in its entirety by reference for all purposes. As a consequence, neither the digital switching noise and associated harmonic content nor the noise associated with switching regulator 260 interfere significantly with the performance of RF circuitry 240, and vice-versa. To provide for the inclusion of RF circuitry 240 and digital circuitry 220 within the same or a single circuit partition 290 (e.g., IC or die), illustrative embodiments according to the invention may employ one or more storage devices to allow data to be stored between digital processing cycles and RF cycles in a time domain isolation system.

Figure 2:
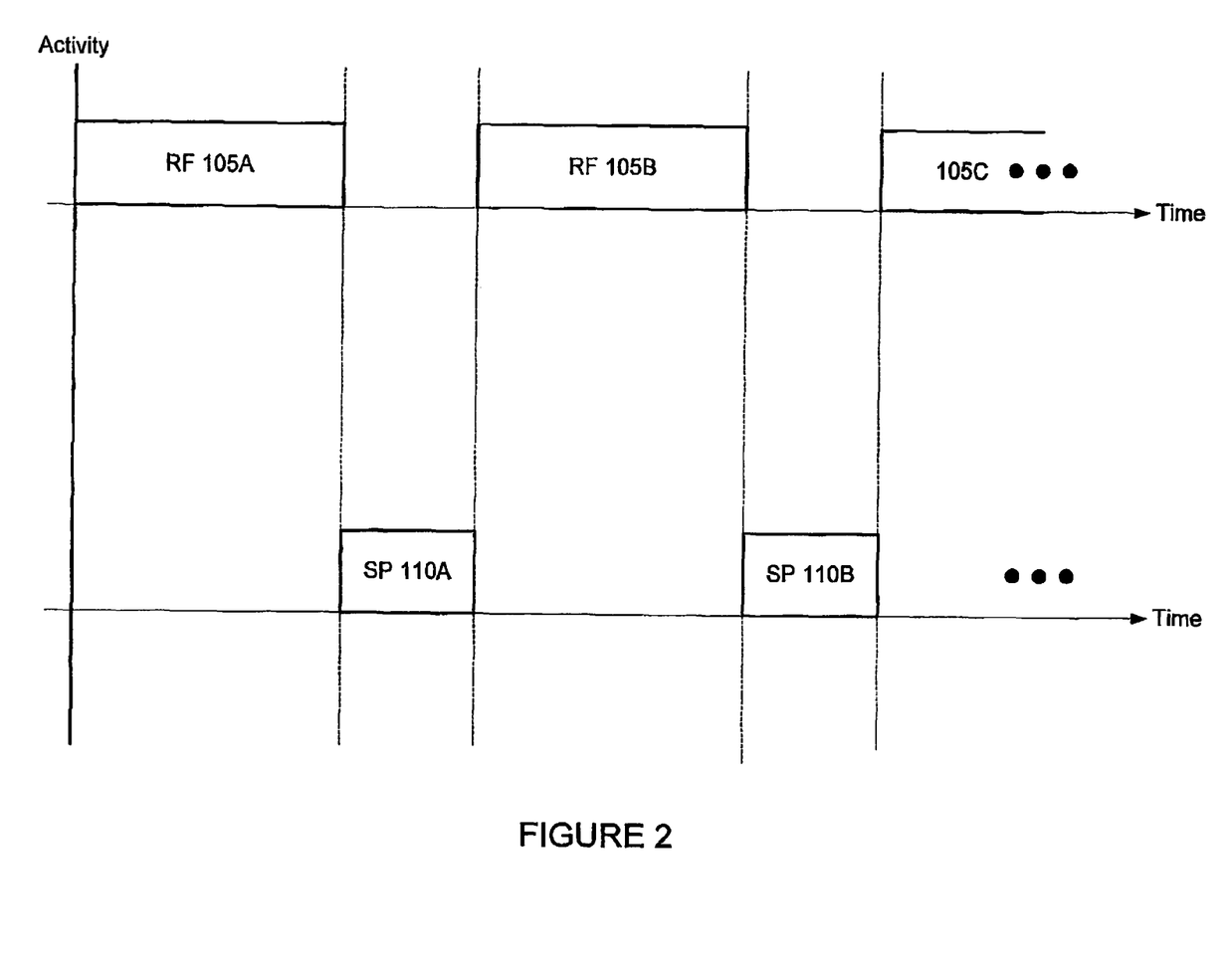
FIG. 2 includes a representation of one embodiment of a set of events in a time-domain isolation communication system.

FIG. 2 illustrates a set of events that occur in a general communication system with time-domain isolation. Broadly speaking, two alternate events take place in such a system: RF reception or transmission, and signal processing. Put another way, the system arranges in time the RF reception or transmission activities and the digital activities so as to avoid or reduce interference between RF circuitry 240 and digital circuitry 220.

Referring to FIG. 2, communication systems or apparatus with time-domain isolation according to exemplary embodiments of the invention use a plurality of RF time-slots 105A, 105B, 105C, and so on. Such systems or apparatus also employ a plurality of signal-processing time-slots 110A, 110B, and so on (it will be understood that signal-processing may refer generally to any activity of digital circuitry in this context). During RF time-slots 105A-105C, the system or apparatus (e.g., the RF front-end in the system or apparatus) may receive RF signals (from a transmitter or transceiver) or transmit RF signals (to a receiver or transceiver), process the received signals, and store the results in one or more storage devices, such as buffer 226. Subsequently, during signal-processing time-slots 110A-110B, the system or apparatus (e.g., the signal-processing circuitry in the system or apparatus) may perform signal-processing tasks on the stored results. (Note, however, that the operation of the RF circuitry and the digital circuitry may overlap by some amount, as described below.)

Alternatively, during RF time-slots 105A-105C, the system or apparatus may transmit RF signals (to a receiver or transceiver). In this mode of operation, during signal-processing 110A-110B, the system or apparatus (e.g., the signal-processing circuitry in the system or apparatus) performs signal-processing tasks on input data (e.g., voice, data), and may store the results in one or more storage devices. Subsequently, during RF time-slots 105A-105C, the system or apparatus (e.g., the RF circuitry of the apparatus or system) may process transmit signals and perform RF operations (for example, up-conversion) on the stored results and transmit an RF signal.

Note that the signal-processing tasks performed during signal-processing time-slots 110A-110B may constitute the core signal-processing functions in an RF communication apparatus. Examples of such tasks include modulation, demodulation, coding, decoding, and the like.

Depending on the specific protocol, architecture, and circuitry used, the system or apparatus may receive and transmit simultaneously, as desired. More commonly, however, the system either transmits signals or receives signals during any of RF time-slots 105A-105C, or in bursts. For example, a GSM-compliant system or apparatus, such as a mobile telephone that complies with the GSM specifications, either receives or transmits RF signals in one or more bursts of activity during RF time-slots 105A-105C.

Note that RF time-slots 105A-105C may have the same or different durations, as desired. Generally, RF time-slots 105A-105C may have unequal lengths so as to accommodate a wide variety of circuitry, systems, protocols, and specifications, as desired. Each of RF time-slots 105A-105C may include several other time-slots or a frame, depending on the particular communication protocol or technique used. For example, in a GSM application, each RF time-slot may include a frame that in turn includes slots for various activities, such as RF reception, RF transmission, monitoring, idle slots, and the like, as described above.

Similarly, signal-processing time-slots 110A-110B may have similar or dissimilar durations, as desired. Generally speaking, the signal-processing time-slots may have unequal lengths so as to accommodate a broad array of signal-processing apparatus, circuitry, algorithms, and processing techniques. Each of signal-processing time-slots 110A-110B may include several other time-slots or time divisions, depending on the particular communication protocol and/or signal-processing techniques and the particular circuitry and technology used. For example, a signal-processing time-slot may include several time-slots, with a portion or particular circuitry active or processing signals during one or more of the time-slots.

Furthermore, one may perform the signal-processing tasks in a serial or multiplexed manner (e.g., by sharing hardware to perform a variety of tasks), in a parallel manner (e.g., by using dedicated hardware for each signal-processing task), or a combination of the two techniques, as desired. The choice of signal-processing hardware, firmware, and software depends on the design and performance specifications for a given desired implementation, as persons of ordinary skill in the art who have the benefit of the description of the invention understand.

To implement a communication system or apparatus with time-domain isolation according to the invention, one may activate, deactivate or switch between the RF circuitry and the digital (signal-processing) circuitry in a variety of ways, as persons of ordinary skill in the art who have the benefit of the description of the invention understand. For example, before a signal-processing time-slot commences, one may deactivate the RF circuitry by powering it down, disabling, or inhibiting its operation or its circuitry. When the signal-processing time-slot ends, one may activate or power up (and settle and calibrate, as appropriate) the RF circuitry to receive and/or transmit, as desired.

As another example, one may deactivate the signal-processing circuitry (e.g., before an RF time-slot commences) by disabling or inhibiting the clock signal or signals within the signal-processing circuitry. More specifically, by using static metal oxide semiconductor (MOS) circuitry, one may shut down the clock signal or signals within the signal-processing circuitry without losing the data present within that circuitry. Accordingly, the signal-processing circuitry can preserve the data within it while the RF circuitry operates. Once the RF circuitry has deactivated (e.g., an RF time-slot has ended), one may activate the signal-processing circuitry by asserting the clock signal or signals in order to commence or continue the processing of the data.

Figure 3A:
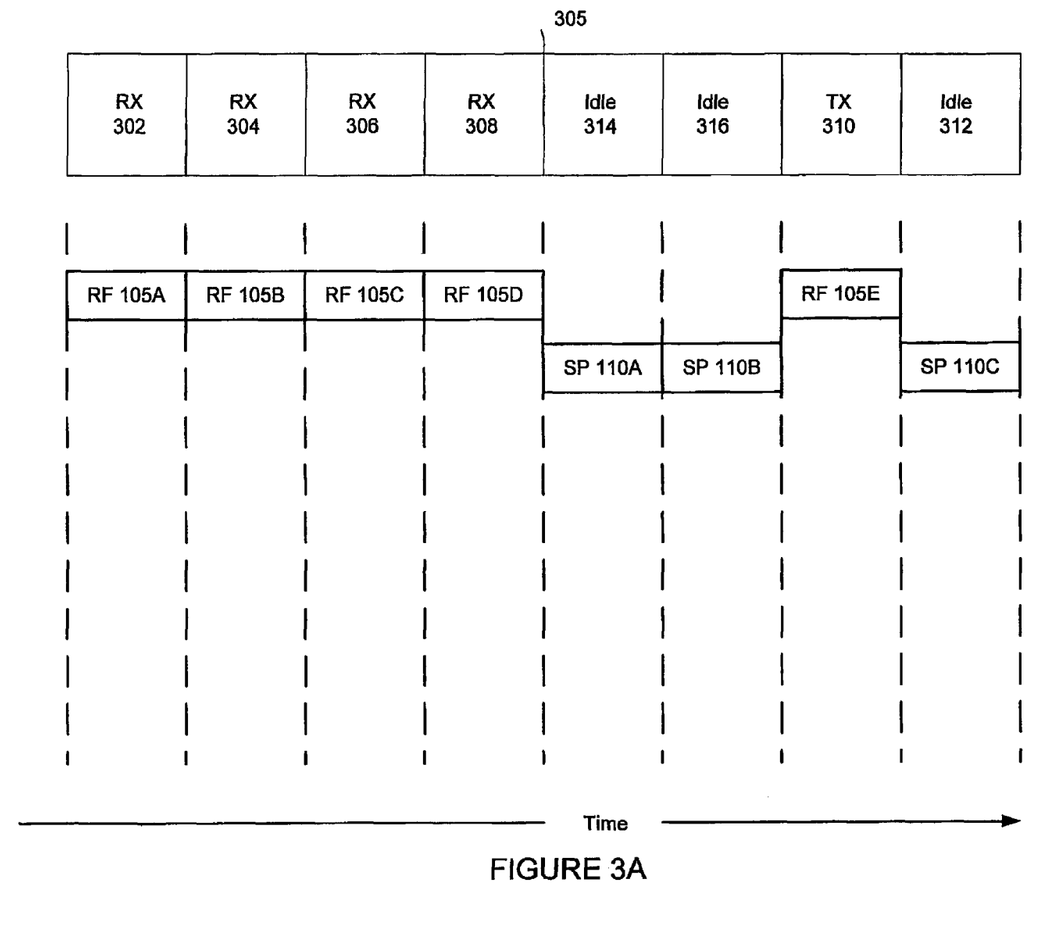
FIG. 3A includes a diagram of one embodiment of employing time-domain isolation in a system utilizing a GPRS class 12 application.

FIG. 3A depicts an embodiment of time-domain isolation employed in a system utilizing a GPRS class 12 application. FIG. 3A shows one example of a GPRS data frame 305 in a typical GPRS class 12 application. Frame 305 includes 8 slots which correspond to bursts of data, four receive slots 302, 304, 306, 308, one transmit slot 310 and three idle slots 312, 314, 316. It may be noted that the location of the various slots shown here are for exemplary purpose. The ideas incorporated herein will equally apply to any other arrangement of receive, transmit and idle slots (with monitoring functions) and that are compatible with any TDMA system including any GPRS systems up to GPRS Class 12, and any other future TDMA systems which may defined or utilized.

As shown in FIG. 3A, RF time-slots 105A, 105B, 105C 105D and 105E may coincide with transmit slot 310 and receive slots 302, 304, 306, 308 of exemplary GPRS frame 305, respectively. Signal-processing time-slots 110A, 110B and 110C take place during idle slots 312, 314 and 316. Thus, during RF time-slots 105A-105E, RF circuitry 240 of mobile device 230 may also be active, while during signal-processing time-slots (110A, 110B, 110C) digital logic 220 may be active.

At some point during the exemplary GPRS frame 105 of FIG. 3A, the function of monitoring signal strength of base stations can occur. This monitoring function is an RF activity and, therefore, can be considered a form of an "RF time-slot." This monitoring function can occur at any time during any of idle slots 312, 314, and 316 (e.g., during any one of those slots or overlapping one or more of those slots) or at any other time designated by the GPRS or other applicable standard. During the RF function of monitoring, digital signal processing is deactivated.

Figure 3B:
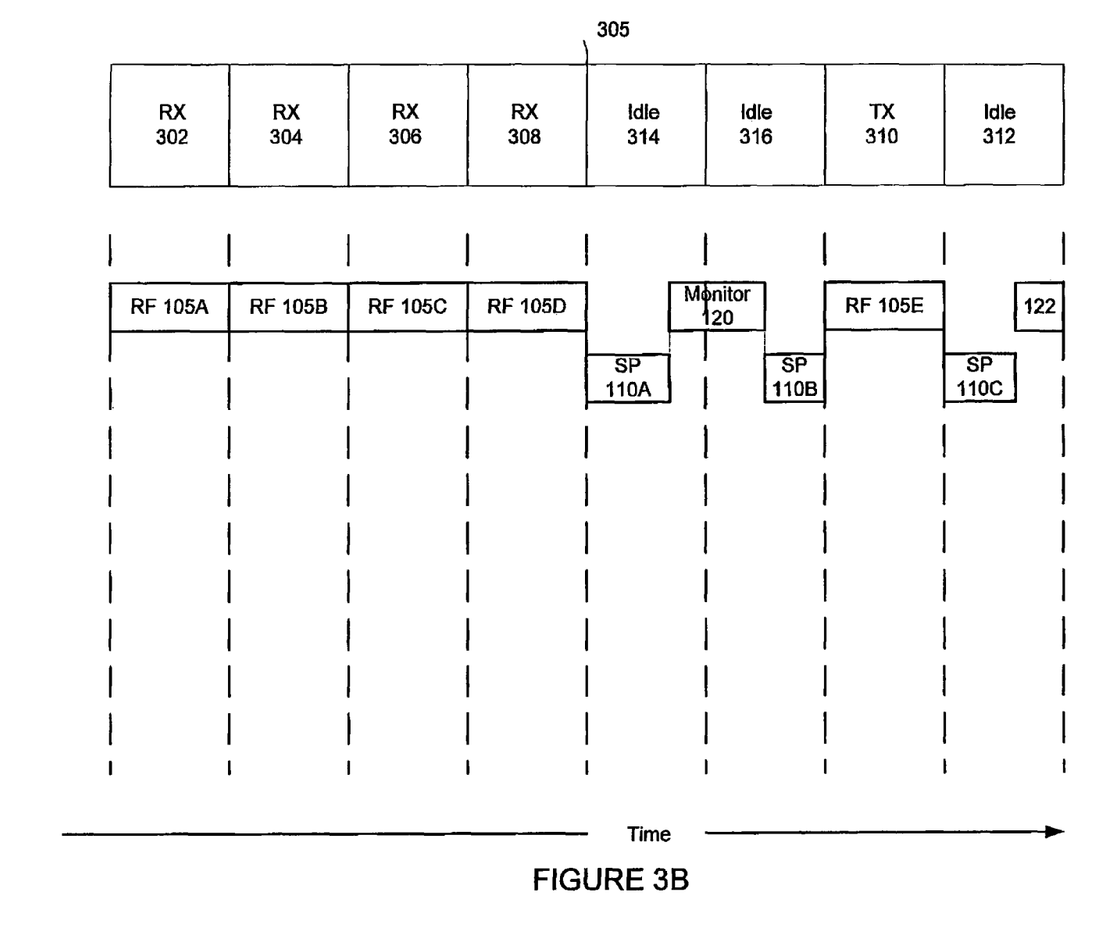
FIG. 3B includes a diagram of another embodiment of employing time-domain isolation in a system utilizing a GPRS class 12 application.

FIG. 3B illustrates one embodiment of the exemplary GPRS frame 305 of FIG. 3A with exemplary monitoring activities that could occur, for example, in one, both or neither of monitor slots 120 and 122 as shown in FIG. 4B. As with other RF slots (in this embodiment, slots 105A-105E), linear regulator 270 is active while monitoring is occurring (e.g., during the monitoring time period(s) 120 and/or 122) to provide current to digital logic 220. Accordingly, signal processing does not occur during the period(s) of time 120 and/or 122 during which monitoring is taking place, and the switching power supply is therefore not active.

Figure 4:
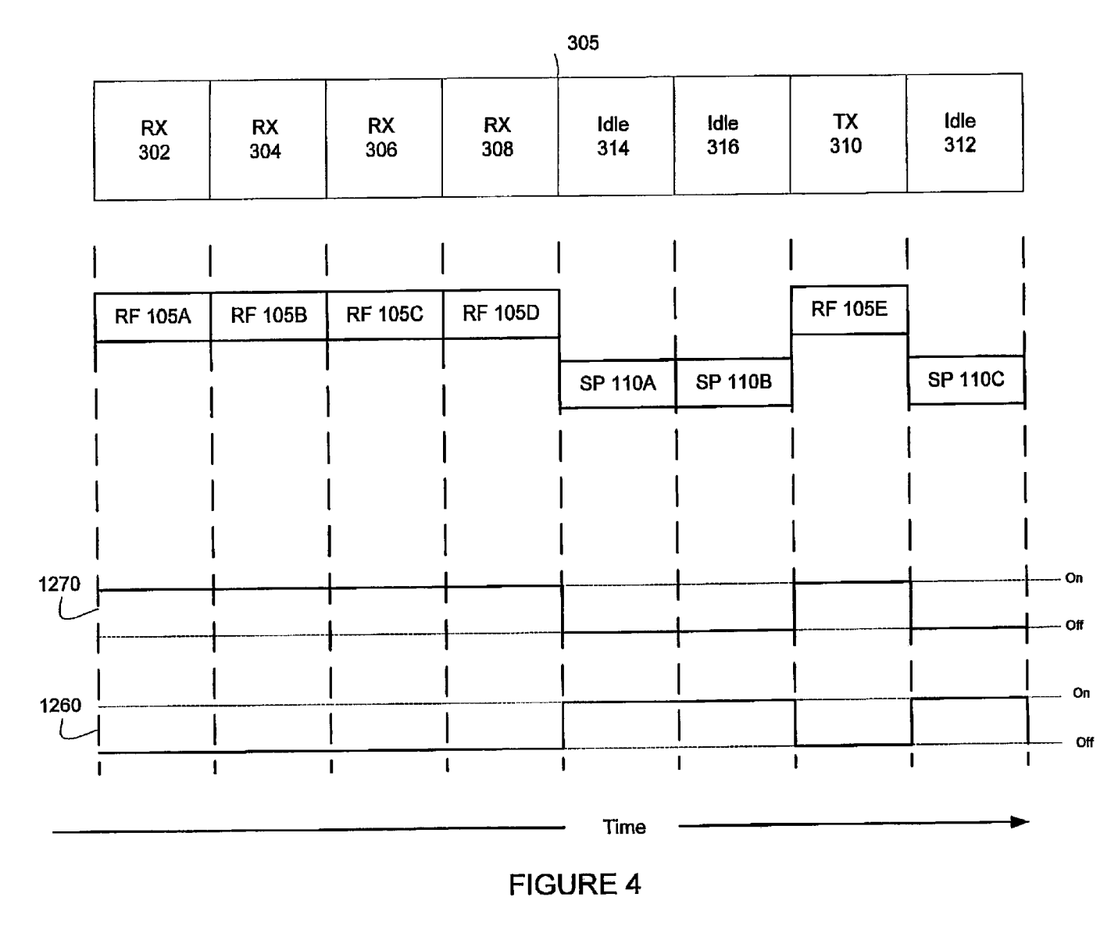
FIG. 4 includes a diagram illustrating an embodiment of the systems and methods of the present invention employed in a device utilizing time-domain isolation in conjunction with a GPRS class 12 application as depicted in FIG. 3A.

FIG. 4 illustrates the use of a linear regulator and a switching regulator in an embodiment of the systems and methods of the present invention employed in a mobile device utilizing time-domain isolation in conjunction with a GPRS class 12 application as depicted in FIG. 3A, including timing diagram 1270 associated with linear regulator 270 and timing diagram 1260 associated with switching regulator 260. Clock/control logic 210 may comprise a real time event controller responsible for transitioning between time-slots 105A, 105B, 105C, 105D, 105E, 110A, 110B and 110C. In one embodiment, the operation of linear regulator 270 and switching regulator 260 are synchronized with time-slots 105A, 105B, 105C, 105D, 105E, 110A, 110B and 110C during operation of mobile device 130, as further described below.

As shown in FIG. 4, during receive slots 105A, 105B, 105C and 105D, digital logic 220 is inactive, and the state of digital logic 220 is maintained by current supplied to digital logic 220 by linear regulator 270. During these RF time-slots 105A, 105B, 105C, 105D, then, RF circuitry 240 listens for or receives incoming signals with a minimum of interference from digital logic 220 or switching regulator 260. At the end of receive slot 105D, clock/control logic 210 deactivates RF circuitry 240, activates switching regulator 260, deactivates linear regulator 270 and enables the clock to digital logic 220. Thus, during signal-processing time-slots 110A, 110B digital logic 220 may be active and powered by current supplied from switching regulator 260.

At the end of signal-processing time-slot 110B, the reverse process occurs: clock/control logic 210 disables or suspends the clock to digital logic 220, switches on linear regulator 270, and deactivates switching regulator 260. Consequently, during RF time-slot 105E RF circuitry 240 transmits with a minimum of interference from digital logic 220 or switching regulator 260 while the state of digital logic 220 is maintained using current provided from linear regulator 270.

At the conclusion of RF time-slot 105E, clock/control logic once again shuts down RF circuitry 240, activates switching regulator 260, deactivates linear regulator 270 and enables the clock to digital logic 220. During signal-processing time-slot 110C, digital logic 220 is active and powered by current supplied from switching regulator 260. Similarly, at the end of signal processing time-slot 110C the reverse process occurs again: clock/control logic 210 disables or suspends the clock to digital logic 220, switches on linear regulator 270, and deactivates switching regulator 260.

It will be apparent to those of skill in the art, that when monitoring signal strength occurs during idle slots 312, 314 or 316 (as depicted with respect to FIGS. 3A and 3B) in FIG. 4, similar switching activities can occur if desired. Signal processing can be halted and linear regulator 270 used to maintain the state of digital logic 260 for the duration of the monitoring function.

It will also be apparent to those of skill in the art after reading this disclosure, that a whole host of methods may be used to switch the source of current to digital logic 220 between switching regulator 260 and linear regulator 270, and the systems and methods of the present invention are not dependent on these methods of transition.

Figure 5:
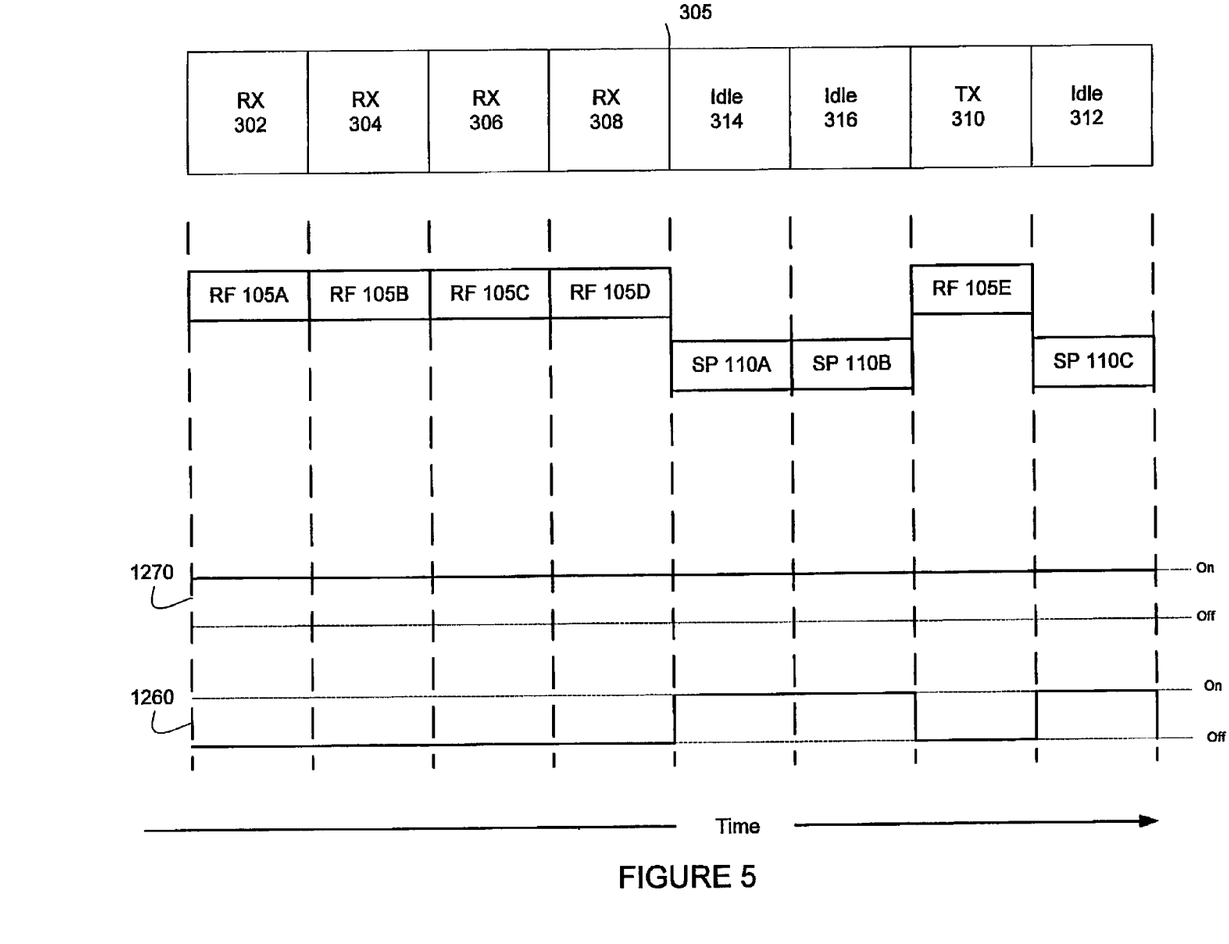
FIG. 5 includes a diagram illustrating another embodiment of the systems and methods of the present invention employed in a device utilizing time-domain isolation in conjunction with a GPRS class 12 application as depicted in FIG. 3A.

For example, FIG. 5 illustrates the use of a linear regulator 260 and a switching regulator 270 in another embodiment of the systems and methods of the present invention employed in a mobile device utilizing time-domain isolation in conjunction with a GPRS class 12 application as depicted in FIG. 3A.

As shown by timing diagram 1270 (associated with switching regulator 270), and timing diagram 1260 (associated with linear regulator 260), in the embodiment illustrated in FIG. 5, linear regulator 270 is always active. However, linear regulator 270 is biased so that when switching regulator 260 is active the output of switching regulator is such that it inherently disables linear regulator 270 from supplying power to digital logic 220, insuring that substantially all current dissipation comes from switching regulator when it is active.

During receive slots 105A, 105B, 105C, 105D, digital logic 220 is inactive, and the state of digital logic 220 is maintained by current supplied to digital logic 220 by linear regulator 270. During these RF time-slots 105A, 105B, 105C, 105D, then, RF circuitry 240 may receive incoming signals with a minimum of interference from digital logic 220 or switching regulator 260. At the end of receive slot 105D, clock/control logic deactivates RF circuitry 240 and activates switching regulator 260. The output of switching regulator 260 inherently deactivates linear regulator 270, insuring that during signal-processing time-slots 110A, 110B digital logic 220 is active and powered by current supplied from switching regulator 260.

At the end of signal-processing time-slot 110B, the reverse process may occur: clock/control logic 210 disables the clock to digital logic 220 and deactivates switching regulator 260. When switching regulator 260 is deactivated, the regulated voltage will drift down due to leakage and loading in digital logic 220 until the current needed to maintain digital logic 220 falls within the range capable of being supplied by linear regulator 270. Consequently, during RF time-slot 105E RF circuitry 240 transmits with a reduction of interference from digital logic 220 or switching regulator 260 while the state of digital logic 220 is maintained using current provided from linear regulator 270.

At the conclusion of RF time-slot 105E, clock/control logic may once again deactivate RF circuitry 240, activate switching regulator 260 and enable the clock to digital logic 220. During signal-processing time-slot 110C digital logic 220 is active and powered by current supplied from switching regulator 260. Similarly, at the end of signal processing time-slot 110C the reverse process occurs again: clock/control logic 210 disables the clock to digital logic 220 and deactivates switching regulator 260.

It will be apparent to those of skill in the art, that when monitoring signal strength occurs during idle slots 312, 314 or 316 (as depicted with respect to FIGS. 3A and 3B) in FIG. 5, similar switching activities can occur if necessary. Signal processing can be deactivated and linear regulator 270 used to maintain the state of digital logic 260 for the duration of the monitoring function.

It will also be apparent to those of skill in the art after reading this disclosure that the timing of events may be altered according to any number of criteria, including the hardware utilized in conjunction with mobile device 130.

Figure 6:
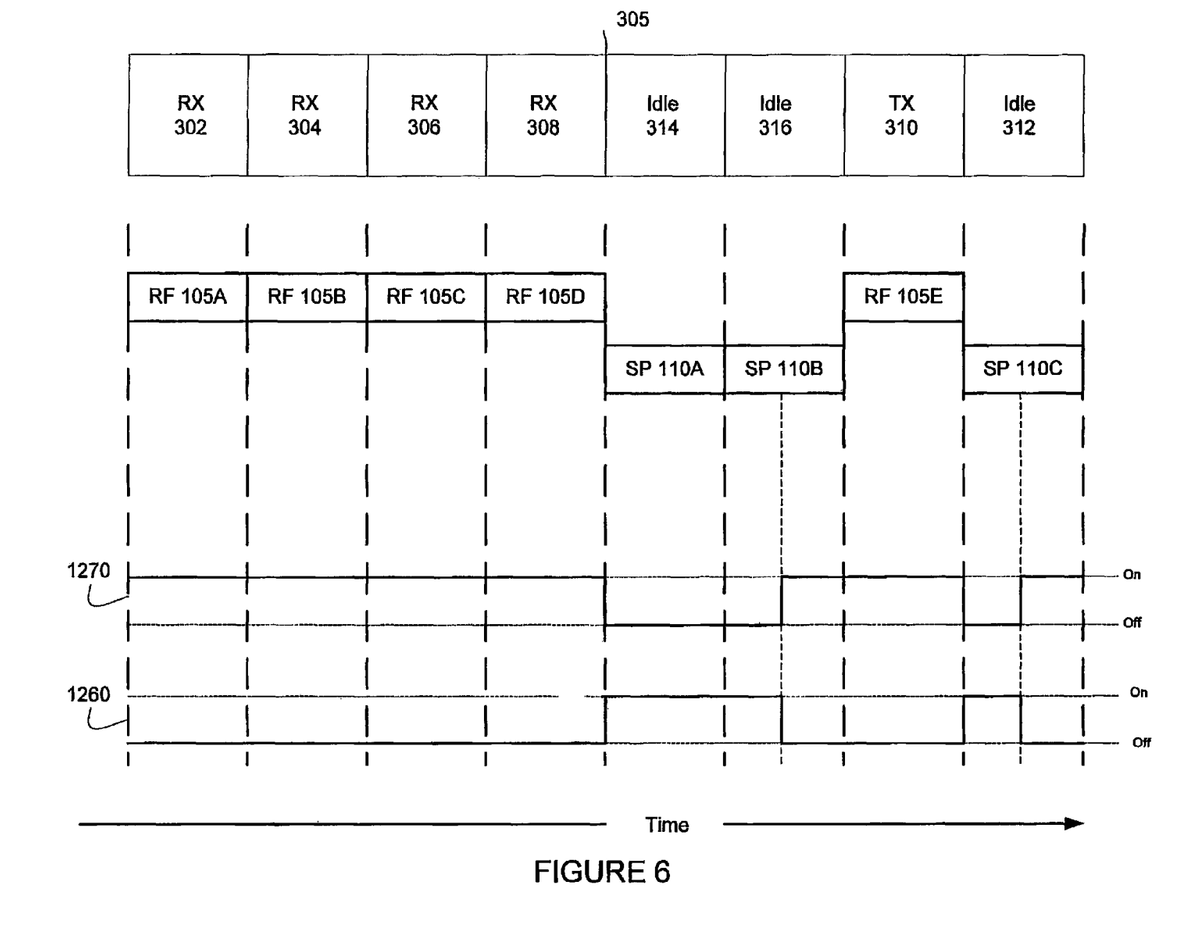
FIG. 6 includes a diagram illustrating yet another embodiment of the systems and methods of the present invention employed in a device utilizing time-domain isolation in conjunction with a GPRS class 12 application as depicted in FIG. 3A.

FIG. 6 illustrates the use of a linear regulator 260 and a switching regulator 270 in yet another embodiment of the systems and methods of the present invention employed in a device utilizing time-domain isolation in conjunction with a GPRS class 12 application as depicted in FIG. 3A. In one embodiment, the timing of switching between linear regulator 270 and switching regulator is designed to give RF circuitry 240 time to settle before it is used for transmitting or receiving.

During receive slots 105A, 105B, 105C, 105D, digital logic 220 is inactive, and the state of digital logic 220 is maintained by current supplied to digital logic 220 by linear regulator 270. During these RF time-slots 105A, 105B, 105C, 105D, then, RF circuitry 240 may receive incoming signals with a reduction of interference from digital logic 220 or switching regulator 260. In the embodiment depicted in FIG. 6, at the end of receive slot 105D, clock/control logic 210 deactivates RF circuitry 240, activates switching regulator 260, deactivates linear regulator 270 and enables the clock to digital logic 220. Thus, during signal-processing time-slots 110A, 110B digital logic 220 may be active and powered by current supplied from switching regulator 260.

Approximately halfway through signal-processing time-slot 110B, however, the reverse process may occur: clock/control logic 210 disables the clock to digital logic 220 activates linear regulator 270, and deactivates switching regulator 260. Because the transition between switching regulator 260 and linear regulator 270 occurs midway through signal-processing time-slot 110B, RF circuitry 240 has the latter half of signal-processing time-slot 110B to settle before the beginning of RF-time-slot 105E. Consequently, RF circuitry 240 may transmit during the entire portion of RF time-slot 105E, and these transmissions still occur with reduced interference from digital logic 220 or switching regulator 260. Additionally, the state of digital logic 220 is maintained using current provided from linear regulator 270.

At the conclusion of RF time-slot 105E, clock/control logic 210 once again deactivates RF circuitry 240, activates switching regulator 260, deactivates linear regulator 270 and enables the clock to digital logic 220. During the first half of signal-processing time-slots 110C digital logic 220 may be active and powered by current supplied from switching regulator 260. Similarly, the reverse process occurs approximately halfway through signal-processing time-slot 110C, clock/control logic 210 disables the clock to digital logic 220 activates linear regulator 270, and deactivates switching regulator 260.

Once again, it will be apparent to those of skill in the art, that when monitoring signal strength occurs during idle slots 312, 314 or 316 (as depicted with respect to FIGS. 3A and 3B) in FIG. 6, similar switching activities can occur if desired. Signal processing can be deactivated and linear regulator 270 used to maintain the state of digital logic 260 for the duration of the monitoring function.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

For example, though a wide variety of timing options commensurate with the scope of the present invention have been depicted, it will be apparent to one of ordinary skill in the art that the benefits and advantages of the present invention can accrue so long as a switching regulator is deactivated for a portion of a time slot during which RF circuitry is active, or so long as a switching regulator is active during a portion of a time slot during which digital circuitry is active.

Furthermore, one may use a variety of circuit and process technologies and materials to implement communication apparatus according to the invention. Examples of such technologies include metal oxide semiconductor (MOS), p-type MOS (PMOS), n-type MOS (NMOS), complementary MOS (CMOS), silicon-germanium (SiGe), gallium-arsenide (GaAs), silicon-on-insulator (SOI), bipolar junction transistors (BJTs), a combination of BJTs and CMOS (BiCMOS), etc. The choice of the technology, circuitry, and materials depends on such factors as design and performance goals and specifications, cost, targeted market segments, and the like, as persons of ordinary skill in the art who have the benefit of the description of the invention understand.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

What is claimed is:

1. A method for efficient power regulation in a system employing radio frequency (RF) circuitry, comprising:
   regulating power to a digital circuitry using a first power regulator during a first time period, wherein the first time period substantially excludes at least one RF time slot;
   inactivating the digital circuitry and the first power regulator during a second time period;
   maintaining a state of the digital circuitry using a second power regulator during the second time period, wherein the second time period substantially coincides with a RF time-slot; and
   activating the RF circuitry during the second time period.

2. The method according to claim 1, wherein the RF circuitry and the digital circuitry are on a single circuit partition.

3. The method of claim 2, wherein the single circuit partition comprises an integrated circuit (IC).

4. The method of claim 2, wherein the first power regulator comprises a switching regulator.

5. The method of claim 4, wherein the system comprises a time division multiple access system.

6. The method of claim 1, wherein the first time period and the second time period substantially coincide with slots in a frame, wherein the frame comprises a set of eight slots, and wherein the eight time slots comprise four receive slots, two idle slots, one transmit slot and one monitor slot, and the first time period substantially coincides with an idle slot or a monitor slot and the second time period substantially coincides with a receive slot or a transmit slot.

7. The method of claim 6, wherein inactivating the digital circuitry and inactivating the first power regulator occurs before or during an RF time slot.

8. A system for power regulation in a radio frequency (RF) environment, comprising:
   digital circuitry;
   RF circuitry coupled to the digital circuitry;
   a first power regulator coupled to the digital circuitry;
   a second power regulator coupled to the digital circuitry; and
   a single circuit partition including an integrated circuit with the digital circuitry and the RF circuitry being on the single circuit partition, and wherein during a first time period, the digital circuitry receives power from the first power regulator and during a second time period, the digital circuitry is inactive, the digital circuitry receives power from a second power regulator, and the first power regulator is inactive, wherein the first time period substantially excludes a RF time slot and the second time period substantially coincides with a RF time-slot.

9. The system of claim 8, wherein the first power regulator comprises a switching regulator.

10. The system of claim 9, wherein the system comprises a time division multiple access system.

11. The system of claim 8, further comprising control logic operable to activate or deactivate digital circuitry and to activate or deactivate RF circuitry.

12. The system of claim 11, wherein the first time period and the second time period are substantially coincide with slots in a frame,
wherein the frame comprises a set of eight time slots, and wherein the eight time slots comprise four receive slots, two idle slots, one transmit slot and one monitor slot, and the first time period substantially coincides with an idle slot or a monitor slot and the second time period substantially coincides with a receive slot or a transmit slot.

13. The system of claim 12, wherein the first power regulator is disabled before or during an RF time slot.

14. The system of claim 8, wherein one of the first and second time periods substantially excludes a RF time slot and the other of the first and second time periods substantially coincides with a RF time-slot.

15. The system of claim 8, further comprising control logic operable to activate or deactivate the digital circuitry and to activate or deactivate the RF circuitry.

16. The system of claim 8, wherein one of the first and second time periods substantially excludes a RF time slot and the other of the first and second time periods substantially coincides with a RF time-slot, and further comprising control logic operable to activate or deactivate the digital circuitry and to activate or deactivate the RF circuitry.

17. An integrated circuit for use in a radio frequency (RF) environment, comprising:
digital circuitry;
RF circuitry coupled to the digital circuitry;
a switching power regulator coupled to the digital circuitry;
a non-switching power regulator coupled to the digital circuitry;
control logic operable to activate or deactivate digital circuitry and to activate or deactivate RF circuitry; and
wherein during a signal-processing period, the digital circuitry receives power from the switching regulator and during a period of RF activity, the digital circuitry is inactive and the digital circuitry receives power from the non-switching regulator, wherein the signal-processing period substantially excludes a RF time-slot and the period of RF activity substantially coincides with a RF time-slot.

18. The system of claim 17, wherein the signal-processing period and the period of RF activity substantially coincide with slots in a frame, wherein the frame comprises a set of eight slots.

19. The system of claim 18, wherein the eight time slots comprise four receive slots, two idle slots, one transmit slot and one monitor slot, and the first time period substantially coincides with an idle slot or a monitor slot and the second time period substantially coincides with a receive slot or a transmit slot.

20. The system of claim 19, wherein the first power regulator is disabled at some point before or during an RF time slot.

21. A method for efficient power regulation in a system employing radio frequency (RF) circuitry, comprising:
operating digital circuitry during a first time period, wherein the digital circuitry receives power from a first power regulator during the first time period;
operating the RF circuitry during a second time period, wherein the digital circuitry is inactive during the second period, the digital circuitry receives power from a second power regulator during the second time period, and the first power regulator is inactive during the second time period, wherein the second time period substantially coincides with a RF time-slot.

22. The method according to claim 21, wherein the RF circuitry and the digital circuitry are on a single circuit partition.

23. The method of claim 22, wherein the single circuit partition comprises an integrated circuit (IC).

24. The method of claim 22, wherein the first power regulator comprises a switching regulator.

25. The method of claim 24, wherein the system comprises a time division multiple access system.

26. The method of claim 25, wherein the first time period substantially excludes a RF time-slot.

27. The method of claim 21, comprising switching between the digital circuitry and the RF circuitry.

28. The method of claim 27, wherein the first time period and the second time period substantially coincide with slots in a frame, wherein the frame comprises a set of eight slots and wherein the eight time slots comprise four receive slots, two idle slots, one transmit slot and one monitor slot, and the first time period substantially coincides with an idle slot or a monitor slot and the second time period substantially coincides with a receive slot or a transmit slot.

29. The method of claim 28, wherein the first power regulator is disabled before or during an RF time slot.

* * * * *

UNITED STATES PATENT AND TRADEMARK OFFICE
CERTIFICATE OF CORRECTION

PATENT NO. : 7,805,170 B2
APPLICATION NO. : 11/094583
DATED : September 28, 2010
INVENTOR(S) : Vishakhadatta It is certified that error appears in the above-identified patent and that said Letters Patent is hereby corrected as shown below:

In The Specification

In Column 3, Line 41, delete "$(V_{load}*I_{load})/(Vbat*\eta)$." and insert -- $(V_{load}*I_{load})/(V_{bat}*\eta)$. --, therefor.

In Column 9, Line 55, delete "digital logic 260" and insert -- digital logic 220 --, therefor.

In Column 9, Lines 63-64, delete "linear regulator 260" and insert -- linear regulator 270 --, therefor.

In Column 9, Line 64, delete "switching regulator 270" and insert -- switching regulator 260 --, therefor.

In Column 10, Lines 1-2, delete "switching regulator 270)," and insert -- switching regulator 260), --, therefor.

In Column 10, Line 3, delete "linear regulator 260)," and insert -- linear regulator 270), --, therefor.

In Column 10, Line 49, delete "digital logic 260" and insert -- digital logic 220 --, therefor.

In Column 10, Line 55, delete "linear regulator 260" and insert -- linear regulator 270 --, therefor.

In Column 10, Line 56, delete "switching regulator 270" and insert -- switching regulator 260 --, therefor.

In Column 11, Line 40, delete "digital logic 260" and insert -- digital logic 220 --, therefor.

Signed and Sealed this
Thirty-first Day of May, 2016

Michelle K. Lee
*Director of the United States Patent and Trademark Office*